J. J. MERVESP.
Horseshoe-Nail.
No. 226,240.                    Patented April 6, 1880.
FIG. 1.    FIG. 2.    FIG. 3.    FIG. 4.
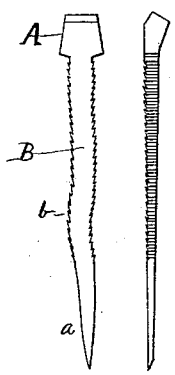 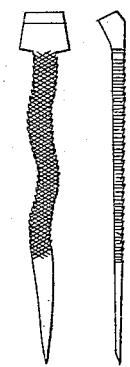 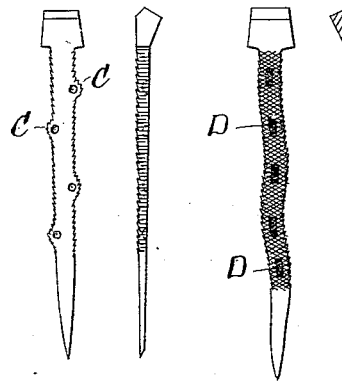 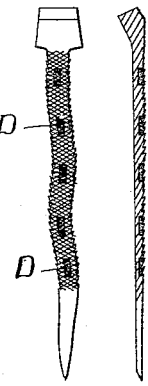
FIG. 5.    FIG. 6.    FIG. 7.
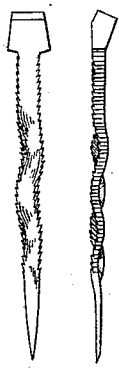 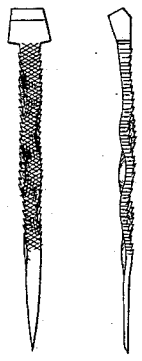 
WITNESSES:
James Fitzpatrick
Chas. E. Pancoast
John J. Mervesp
INVENTOR.

UNITED STATES PATENT OFFICE.

JOHN J. MERVESP, OF PHILADELPHIA, PA., ASSIGNOR TO CALEB M. TALCOTT AND WM. H. POST, OF HARTFORD, AARON W. C. WILLIAMS, OF BROOKFIELD, AND GEORGE J. CAPEWELL, OF CHESHIRE, CONN.

HORSESHOE-NAIL.

SPECIFICATION forming part of Letters Patent No. 226,240, dated April 6, 1880.

Application filed January 17, 1879.

*To all whom it may concern:*

Be it known that I, JOHN J. MERVESP, of the city of Philadelphia, in the county of Philadelphia and State of Pennsylvania, have invented a new and useful Improvement in Horse and Ox Shoe Nails, which improvement is fully set forth in the following specification, reference being had to the accompanying drawings.

The object of this invention is to avoid the necessity for clinching horseshoe-nails by hammering on the outside of the hoof, and thereby to save time and labor and to promote the comfort of the horse. This object I accomplish by providing my horseshoe-nails with barbs or serrations, whereby they are held against withdrawal.

In the accompanying drawings, Figure 1 represents a front and a side view of my improved horseshoe-nail; and Figs. 2, 3, 4, 5, 6, and 7 are similar views of modifications of the same.

In Fig. 1, A designates the head of the nail, *a* the point thereof, and B the shank thereof, which is provided on its edges with barbs or serrations *b*. This form of nail has a slight curvature just above the smooth part which forms the point.

The nail shown in Fig. 2 has two curvatures in its serrated portion, giving it, in the front view, an undulating shape.

The nail shown in Fig. 3 is straight, but is provided on its serrated edges with curved extensions or offsets, also serrated, which increase the resistance.

The nail shown in Fig. 4 has, in addition to its serrations, a series of recesses, D, into which the substance of the hoof will set. Both this form of nail and that shown in Fig. 3 have serrations on their sides as well as on their edges.

The nails shown in Figs. 5, 6, and 7 have a part of their substance twisted or undulated, so as to extend laterally beyond another part, giving the nail an irregular shape. They are serrated on the edges, or, as shown in Fig. 6, on the edges and sides, or faces also.

When the nail is to be used for fastening on a shoe it is simply driven in. If the point protrudes it may be filed off without jar or shock to the hoof. I prefer, however, to have the nails of such length that they will not protrude.

In that case the strokes requisite for driving in the nails constitute the entire labor of shoeing. The operation is therefore very quickly performed.

For light-draft horses the form of nail shown in Fig. 1 will answer very well; but horses of heavier draft require, in some cases, some one of the modifications shown in the remaining figures, the curvatures, recesses, and offsets of which aid the barbs or serrations in resisting the withdrawal of the nail.

Having thus described my invention, what I claim as new, and desire to secure by Letters Patent, is—

1. A horseshoe-nail provided with barbs or serrations which resist its withdrawal from the hoof, substantially as and for the purposes set forth.

2. A horseshoe-nail provided with curvatures and serrations which resist its withdrawal from the hoof, substantially as and for the purposes set forth.

JOHN J. MERVESP.

Witnesses:
CHAS. E. PANCOAST,
JAMES FITZPATRICK.